United States Patent [19]

Takizawa et al.

[11] Patent Number: 5,515,386
[45] Date of Patent: May 7, 1996

[54] TRANSMISSION CIRCUIT FOR TRANSMITTING FIXED-LENGTH DATA

[75] Inventors: Yuji Takizawa; Masaaki Kawai; Hidetoshi Naito; Kazuyuki Tajima; Satomi Ikeda, all of Kawasaki, Japan

[73] Assignee: Fujitsu Limited, Kanagawa, Japan

[21] Appl. No.: 311,727

[22] Filed: Sep. 23, 1994

Related U.S. Application Data

[63] Continuation of Ser. No. 956,842, Oct. 2, 1992, abandoned.

[30] Foreign Application Priority Data

Oct. 2, 1991  [JP]  Japan .................................. 3-282072

[51] Int. Cl.⁶ ............................ G06F 11/00; H04Q 11/04
[52] U.S. Cl. .............................................. 371/37.1; 370/60
[58] Field of Search ........................ 371/37.1, 35; 370/60, 370/60.1, 90, 92, 99, 49.5, 42

[56] References Cited

U.S. PATENT DOCUMENTS

| | | | |
|---|---|---|---|
| 4,518,960 | 5/1985 | Clark | 370/60 |
| 5,124,977 | 6/1992 | Kozaki et al. | 370/60 |
| 5,228,031 | 7/1993 | Mertelmeier et al. | 370/60 |
| 5,228,032 | 7/1993 | Mertelmeier et al. | 370/60 |
| 5,230,002 | 7/1993 | Yamashita et al. | 371/37.1 |

Primary Examiner—Robert W. Beausoliel, Jr.
Assistant Examiner—Trinh Tu

[57] ABSTRACT

A transmission circuit transmits a normal cell data and an idle cell data via a communication line. The idle cell data is transmitted to fill time slots in the communication line at which there is no normal data to be transmitted, each of the normal cell data and idle cell data including first data, second data and third data. The first, second and third data of the normal cell data respectively indicate a destination, an error correcting code of the first data and desired information. The first and second data of the idle cell data have predetermined bit patterns and the third data of the idle cell data may have any arbitrary bit pattern. The transmission circuit includes a first output circuit for outputting the normal cell data, an error correcting code generator for generating the second data based on the first data of the normal cell data supplied from the first output circuit, a second output circuit for outputting the first and second data of the idle cell data, a scrambler for scrambling the third data of the normal cell data supplied from the first output circuit, and a selector for selecting one of the first output circuit, the error correcting code generator, the second output circuit and the scrambler in accordance with a predetermined order, so that the normal cell data and the idle cell data are output from the selector.

10 Claims, 18 Drawing Sheets

NORMAL CELL ①

IDLE CELL ②

F I G. 6
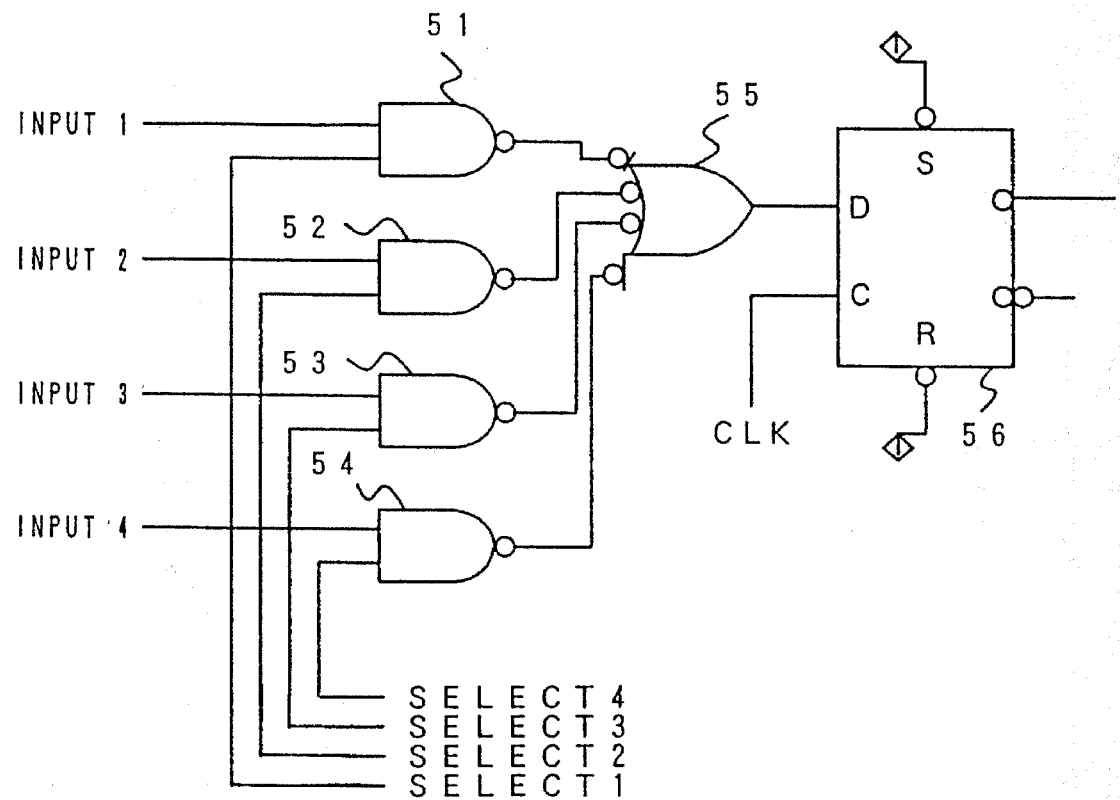

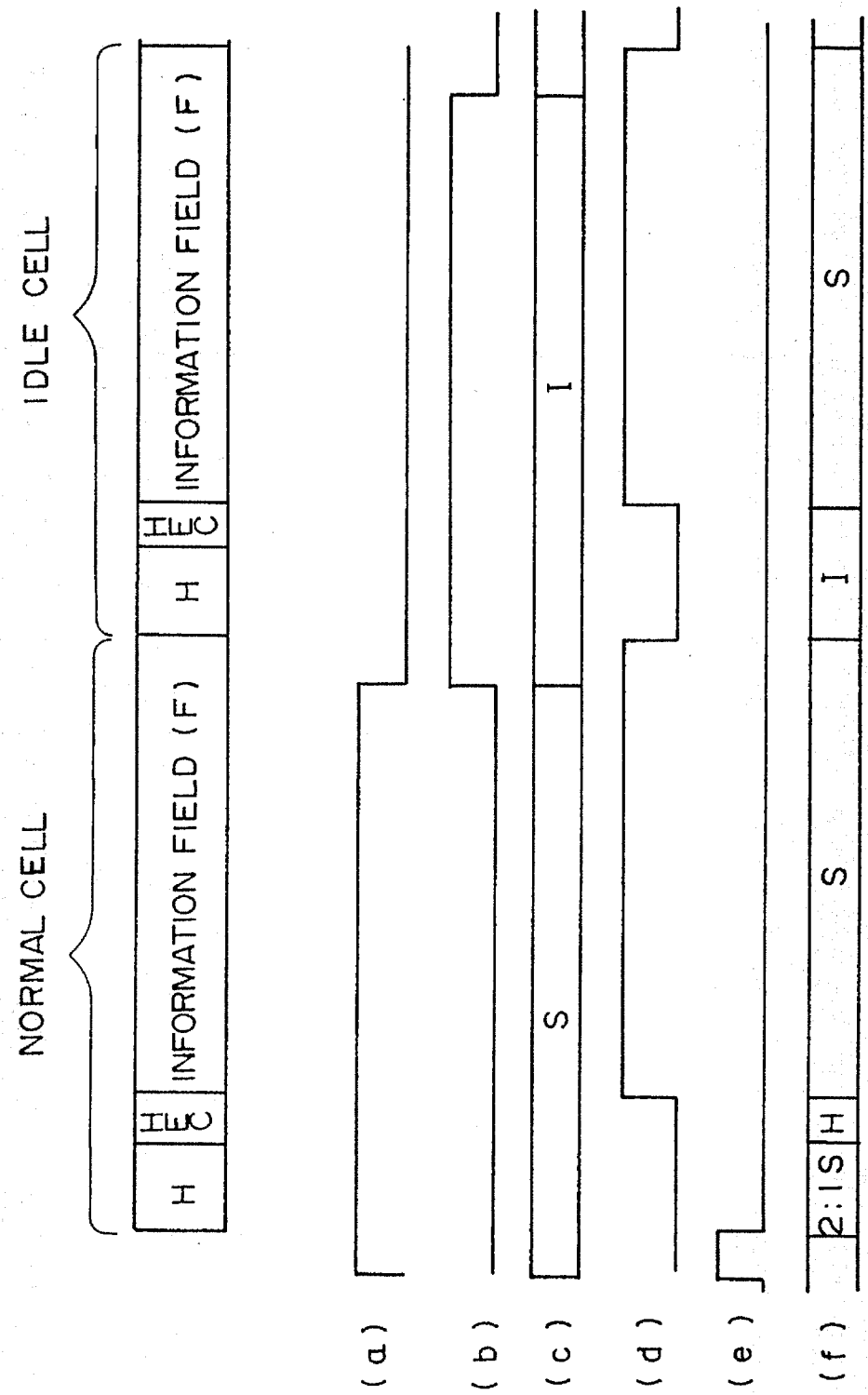

TRANSMISSION CIRCUIT FOR TRANSMITTING FIXED-LENGTH DATA

This is a continuation of application Ser. No. 07/956,842, filed Oct. 2, 1992, now abandoned.

BACKGROUND OF THE INVENTION (1) Field of the Invention

The present invention generally relates to a transmission circuit for transmitting fixed-length data such as cell data, and more particularly to a transmission circuit, for transmitting fixed-length data, in which the number of circuit elements can be decreased.

(2) Description of Related Art

Recently, to more effectively use a communication line, a system has been proposed in which information is divided into units each having a predetermined data length and being transmitted through the communication line. It is desired that a transmission circuit used in this system be of a small scale and that operations thereof be performed with a small power dissipation.

A unit referred to as a "cell" has been proposed. Two types of cells are used for transmitting desired information through the communication line. A first type of a cell is referred to, for example, as a normal cell and is constituted as shown in FIG. 1A. Referred to FIG. 1A, the normal cell is formed of a heading data (H), a head error correcting code (HEC) and an information field (F). The heading data includes destination data indicating a destination to which data should be transmitted. The head error correcting code (HEC) is used for correcting an error in the heading data (H). The information field (F) is data, which is desired to be transmitted to the destination. A second type of a cell is referred to, for example, as an idle cell. The idle cell is transmitted through the communication line when there is no normal cell to be transmitted. That is, an idle cell includes no valid data and is used for filling idle time slots in the communication line. The idle cell is constituted as shown in FIG. 1B. Referring to FIG. 1B, the idle cell is also formed of a heading data (H), a head error correcting code (HEC) and an information field (F). The heading data (H) and the head error correcting code (HEC) of the idle cell have a fixed pattern. The information field of the idle cell has either a predetermined pattern or any pattern.

A conventional transmission circuit for transmitting cell data described above in ATM (Asynchronous Transfer Mode) is shown in FIG. 2.

Referring to FIG. 2, a cell data output unit 1 generates normal cells as shown in FIG. 1A and outputs them. An idle cell generating unit 12 generates idle cells as shown in FIG. 1B and outputs them. The cell data output unit 1 and the idle cell generating unit 12 are connected to a first selector 21. The first selector 21 has two input ports and one output port. A scrambler 3 scrambles the information field (F) of each of cells output from the first selector 21. The output port of the first selector 21 and the scrambler 3 are connected to a second selector 22. The second selector 22 has two input ports and one output port. An error correcting code generator 2 calculates an error correcting code based on the heading data in each normal cell. The output port of the second selector 22 and the error correcting code generator 2 are connected to a third selector 23. The third selector 23 has two input ports and one output port. A controller 65 controls the cell data output unit 1, the idle cell generating unit 12, the scrambler 3, the error correcting code generator 2 and the first, second and third selectors 21, 22 and 23. 8-bit parallel data is processed in this transmission circuit.

In the above conventional transmission circuit, three selectors 21, 22 and 23, each having two input ports and one output port, are provided. Each of the selectors 21, 22 and 23 has a circuit as shown in FIG. 3. The circuit shown in FIG. 3 corresponds to each bit in the 8-bit parallel data and is formed of three NAND gates and a D-type flip flop. Thus, each selector to which 8-bit data is supplied has eight circuits, shown in FIG. 3, arranged in parallel to each other.

The transmission circuit shown in FIGS. 2 and 3 operates in the following manner.

In a case where the normal cell is transmitted, first, the first selector 21 selects the cell data output unit 1, then the second selector 22 selects the output port of the first selector 21, and the third selector 21 selects the output port of the second selector 22. As a result, the heading data (H) of the normal cell output from the cell data output unit 1 passes through the first, second and third selectors 21, 22 and 23 and is output from this transmission circuit as it is. Next, the third selector 23 switches the selection to the error correcting code generator 2. The heading data (H) is supplied from the cell data output unit 1 to the error correcting code generator 2 via the first and second selectors 21 and 22. The error correcting code generator 2 calculates a head error correcting code (HEC). Then the head error correcting code (HEC) is output from the transmission circuit via the third selector 23 so as to be added to the heading data (H).

Then, the second selector 22 switches the selection to the scrambler 3 and the third selector 23 switches the selection to the output of the second selector 21. In this case, the information field (F) of the normal cell output from the cell data output unit 1 is supplied to the scrambler 3 via the first selector. The scrambler 3 scrambles the information field (F) of the normal cell so as to randomize bits in the information field (F). The information field (F) processed by the scrambler 3 is output from the transmission circuit via the second and third selectors 22 and 23. In this case, as the heading data (H) and the head error correcting code (HEC) are used for synchronizing operation of the normal cell, the heading data (H) and the head error correcting code (HEC) are not processed by the scrambler 3.

When there is no normal call to be transmitted, the idle cell is output from the transmission circuit so as to fill an idle time slot in the communication line. In this case, first, the first selector 21 selects the idle cell generating unit 12, the second selector 22 selects the output of the first selector 21, and the third selector 23 selects the output of the second selector 22. Under this condition, the heading data (H) and the head error correcting code (HEC) having predetermined bit patterns are output from the idle cell generating unit 12 and pass through the first, second and third selectors 21, 22 and 23. As a result, the heading data (H) and the head error correcting code (HEC) of the idle cell is output from the transmission circuit. Next, the second selector 22 switches the selection to the scrambler 3. The information field (F) of the idle cell is supplied from the idle cell generating unit 12 to the scrambler 3 via the first selector 21, so that the information field (F) is scrambled by the scrambler 3. As a result, the information field (F) of the idle cell processed by scrambler 3 is output from the transmission circuit via the second and third selectors 22 and 23.

According to the above processes, the normal cell as shown in FIG. 1A and the idle cell as shown in FIG. 1B are transmitted from the transmission circuit through the communication line. The above selecting operations of the first, second and third selectors 21, 22 and 23 are controlled by the controller 65.

The conventional transmission circuit for transmitting data cell by cell as described above must be provided with three selectors each having two input ports and one output port. Thus, in a case where 8-bit data is processed in the transmission circuit, the total numbers of NAND gates and D-type flip flops used in three selectors are respectively seventy two and twenty four. That is, a large number of circuit elements are needed in the conventional transmission circuit. Thus, the dissipation power of the transmission circuit increases.

SUMMARY OF THE INVENTION

Accordingly, a general object of the present invention is to provide a transmission circuit for transmitting fixed-length data in which circuit the disadvantages of the aforementioned prior art are eliminated.

A more specific object of the present invention is to provide a transmission circuit for transmitting fixed-length data in which the number of circuit elements can be decreased.

The above objects of the present invention are achieved by a transmission circuit for transmitting a first type of fixed-length data and a second type of fixed-length data via a communication line, the second type of fixed-length data being transmitted to fill time slots in the communication line at which time slots there is no first type of fixed-length data to be transmitted, each of the first and second types of fixed-length data including first data, second data and third data, the first, second and third data of the first fixed-length data respectively indicating a destination, an error correcting code of the first data and information that it is desired to transmit, the first and second data of the second type of fixed-length data having predetermined bit patterns and the third data of the second type of fixed-length data having an arbitrary bit pattern, the transmission circuit comprising: first output means for outputting the first type of fixed-length data; error correcting code generating means, coupled to the output means, for generating the second data based on the first data of the first type of fixed-length data supplied from the first output means; second output means for outputting the first and second data of the second type of fixed-length data; scrambler means, coupled to the first output means, for scrambling the third data of the first type of fixed-length data supplied from the first output means; and selecting means, coupled to the first output means, the error correcting code generating means, the second output means and the scrambler means, for selecting one of the first output means, the error correcting code generating means, the second output means and the scrambler means in accordance with a predetermined order, so that the first type of fixed-length data and the second type of fixed-length data are output from the selecting means.

According to the present invention, as the selector selects one from four units consisting of the first output means, the error correcting code generating means, the second output means and the scrambler means, a number of selectors to be provided with the transmission circuit can be decreased. That is, the number of circuit elements can be decreased. Thus, power dissipation in the transmission circuit can be decreased. Moreover, delay time arising from processes of the transmission circuit can be also decreased.

Additional objects, features and advantages of the present invention will become apparent from the following detailed description when read in conjunction with the accompanying drawings.

BRIEF DESCRIPTION OF THE DRAWINGS

FIG. 6 is a circuit diagram illustrating a selector provided in the transmission circuit shown in FIG. 5;

FIG. 18 is a flow chart illustrating operations of the transmission circuit shown in FIG. 17.

DESCRIPTION OF THE PREFERRED EMBODIMENTS

A description will now be given, with reference to FIG. 4, of the principle of a first embodiment of the present invention.

Figure 4:
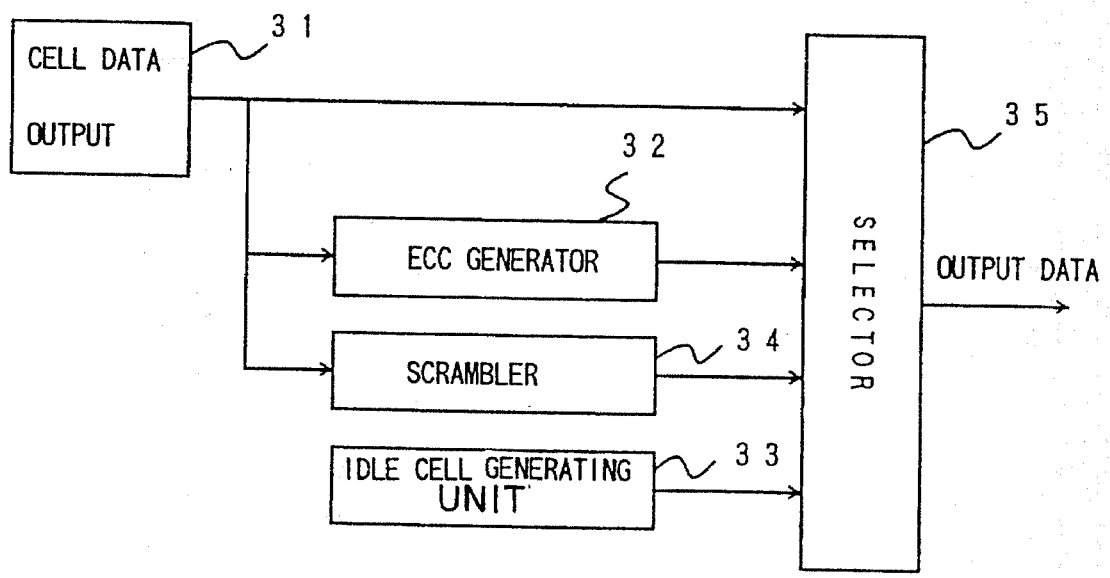
FIG. 4 is a block diagram illustrating an essential part of a transmission circuit according to a first embodiment of the present invention.

Referring to FIG. 4, a transmission circuit has a cell data output unit 31 for outputting normal cell data, an error correcting code generator 32, a scrambler 34, an idle cell generating unit 33 and a selector 35. The selector 35 has four input ports and one output terminal.

Figure 1A:
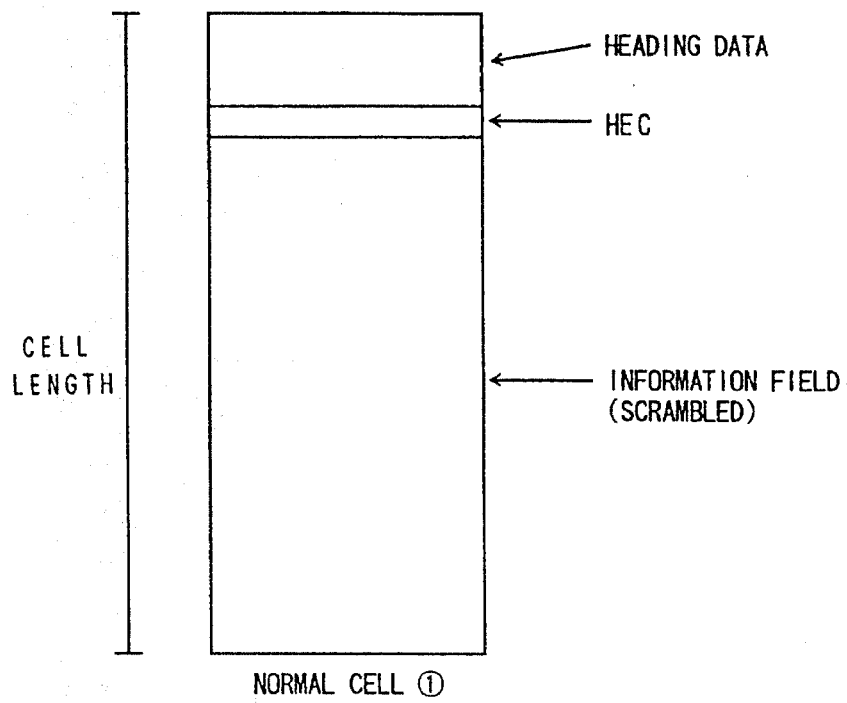
FIG. 1A is a diagram illustrating a normal cell.
Figure 1B:
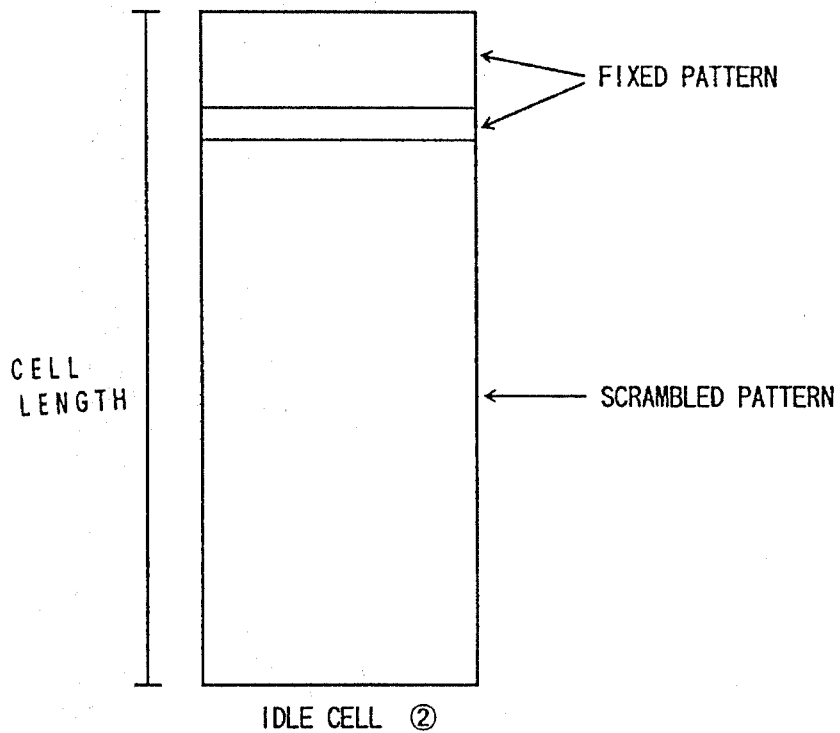
FIG. 1B is a diagram illustrating an idle cell.

A transmission circuit shown in FIG. 4 outputs normal cell data as shown in FIG. 1A and idle cell data as shown in FIG. 1B. When there is no normal cell data to be transmitted, the idle data is output from the transmission circuit so as to fill idle slots in the communication line. Referring to FIG. 4, the transmission circuit has a cell data output unit 31 for outputting normal cell data as shown in FIG.1A, an error correcting code generator 32 for calculating an error correcting code based on the heading data (H) of the normal cell, a scrambler 34 for scrambling the information field (F) of a normal cell, an idle cell generating unit 33 for generating idle cell data shown in FIG. 1B, and a selector 35. The selector 35 selects one of the circuit units of the cell data output unit 31, the error correcting code generator 32, the scrambler 34 and the idle cell generating unit 33.

In a case where a normal cell is output, the selector 35 selects the cell data output unit 31 so that the heading data (H) is output via the selector Then selector 35 selects the error correcting code generator 32 so that the head error correcting code (HEC) is output via the selector 35. After that, the selector selects the scrambler 34 so that the information field (F) processed by the scrambler 34 is output via the selector 35. In a case where an idle cell is output, the selector 35 selects the idle cell generating unit 33 so that the heading data (H) and the head error correcting code (HEC) having predetermined bit patterns are successively output via the selector 35. Then the selector 35 selects the scrambler 33 so that scrambled data is output via the selector 35.

Figure 2:
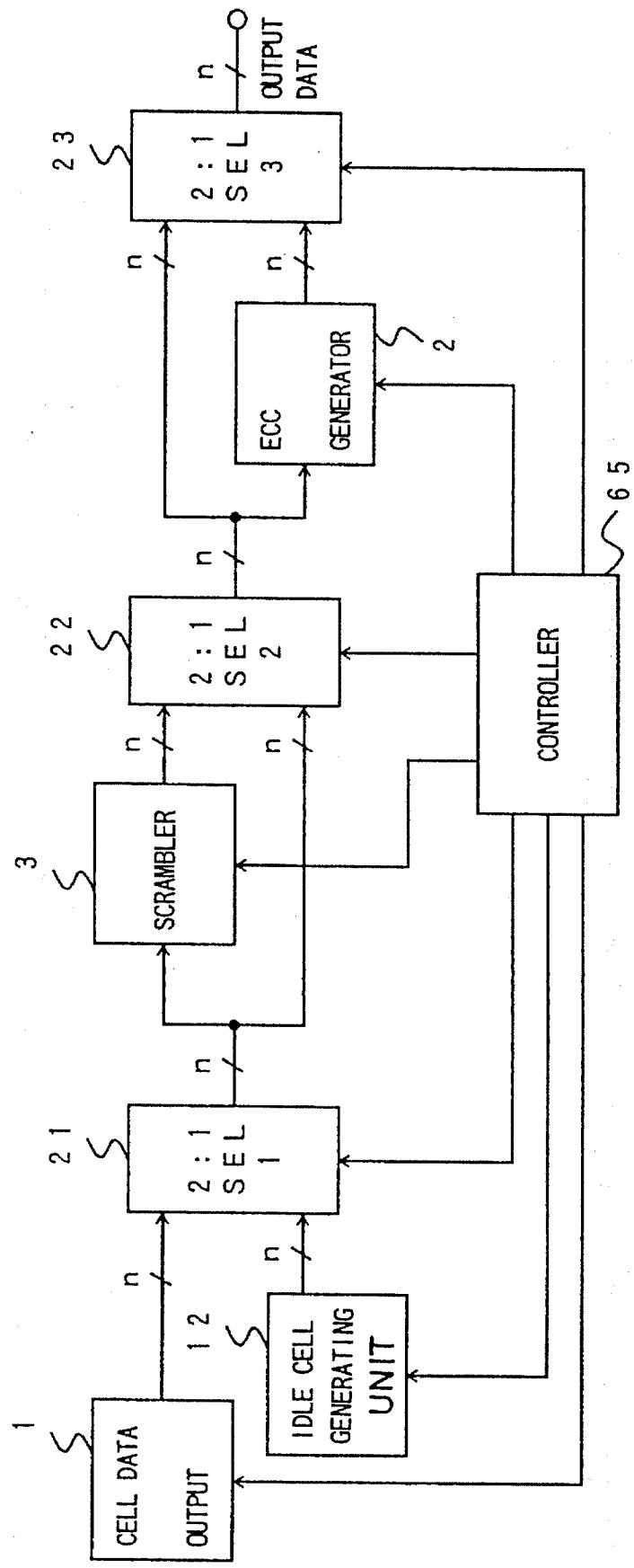
FIG. 2 is a block diagram illustrating a conventional transmission circuit for transmitting cell data.
Figure 5:
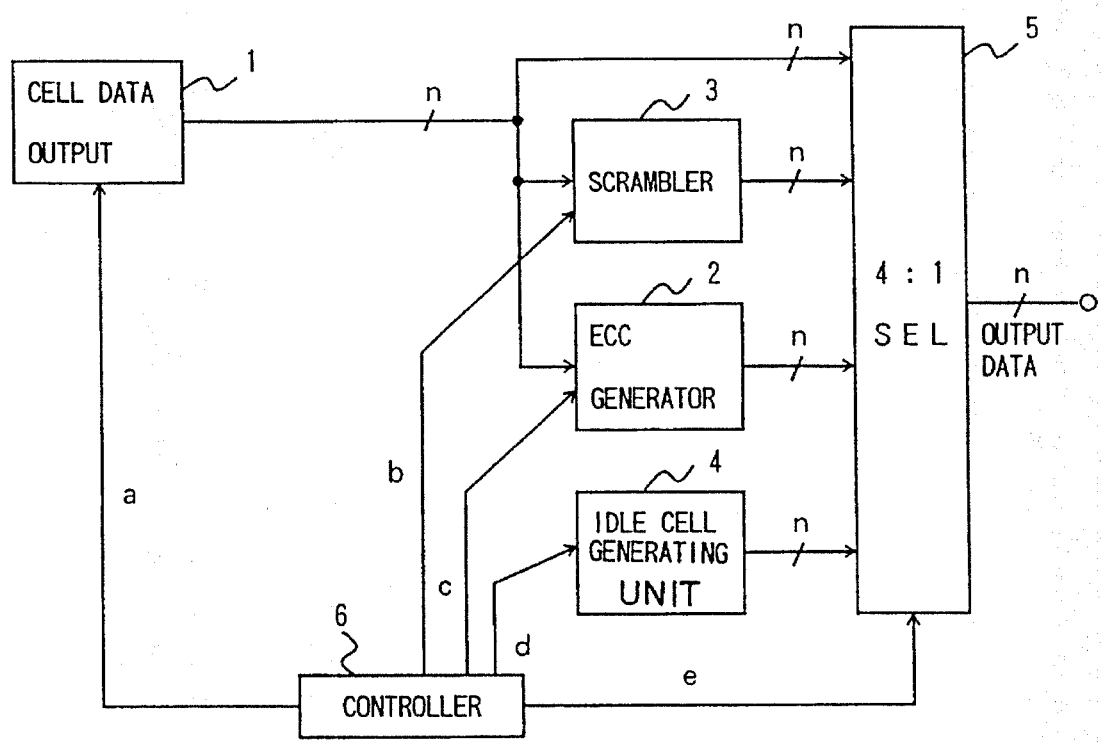
FIG. 5 is a block diagram illustrating a transmission circuit according to the first embodiment of the present invention.

A transmission circuit according to the first embodiment is shown in FIG. 5. In FIG. 5, those parts which are the same as those shown in FIG. 2 are given the same reference numbers.

Referring to FIG. 5, the transmission circuit has the cell data output unit 1, the error correcting code generator 2, the scrambler 3, an idle cell generating unit 4, a selector 5 and a controller 6. The cell data output unit 1 generates the normal cell as shown in FIG. 1A. The idle cell generating unit 4 generates only the heading data (H) and the head error correcting code (HEC) of the idle cell. The selector 5 has four input ports and one output port. The cell data output unit 1, the error correcting code generator 2 and the scrambler 3 and the idle cell generator 4 are connected to the selector 5. The controller 6 supplies control signals (a), (b), (c), (a) and (e) to the cell data output unit 1, the scrambler 3, the error correcting code generator 2, the idle cell generating unit 4 and the selector 5 respectively. The selector 6 is controlled by the control signal (e) supplied from the controller 6 so as to select one of the cell data output unit 1, the scrambler 3, the error correcting code generator 2 and the idle cell generating unit 4. This transmission circuit processes n-bit parallel data.

The selector 5 has a circuit as shown in FIG. 6. The circuit shown in FIG. 6 corresponds to each bit in the n-bit parallel data and is formed of four NAND gates 51, 52, 53 and 54 each having two input ports, a NAND gate 55 having four input ports and a D-type flip flop 56. In a case where n-bit data is processed, n circuits as the one shown in FIG. 6 are arranged in parallel to each other in the selector 5. Thus, the selector 5 is formed of 4n NAND gates each having two input ports, n NAND gates each having four input ports and n D-type flip flops. In a case where n=8 (8-bit data is processed), the selector 5 is formed of thirty two NAND gates each having four input ports, eight NAND gates each having four input ports and eight D-type flip flops.

The data cell output unit 1 is connected to the first NAND gate 51 via a first input port INPUT1, the scrambler 3 is connected to the second NAND gate 52 via a second input port INPUT2, the error correcting code generator 2 is connected to the third NAND gate 53 via a third input terminal INPUT3, and the idle cell generating unit 4 is connected to the fourth NAND gate 54 via a fourth input port INPUT4. The control signal. (e) supplied from the controller 6 to the selector 5 is formed of a first selecting signal SELECT1, a second selecting signal SELECT2, a third selecting signal SELECT3 and a fourth selecting signal SELECT4 respectively supplied to the NAND gates 51, 52, 53 and 54.

In the transmission circuit shown in FIG. 5, as the information field (F) of the idle cell can be formed of arbitrary data, the idle cell generator 4 generates only the heading data (H) and the head error correcting code (HEC) having predetermined bit patterns. The cell data output unit 1, the idle cell generating unit 4, the error correcting code generator 2 and the scrambler 3 can be formed, for example, of circuits standardized by CCITT. The transmission circuit operates in synchronism with a predetermined clock signal. In this first embodiment, it is assumed that delay time of each of the processes in the scrambler 3 and the error correcting code generator 2 is less than a period of the clock signal.

Operations of the transmission circuit shown in FIG. 5 will be described below with reference to a timing chart shown in FIG. 7.

Figure 7:
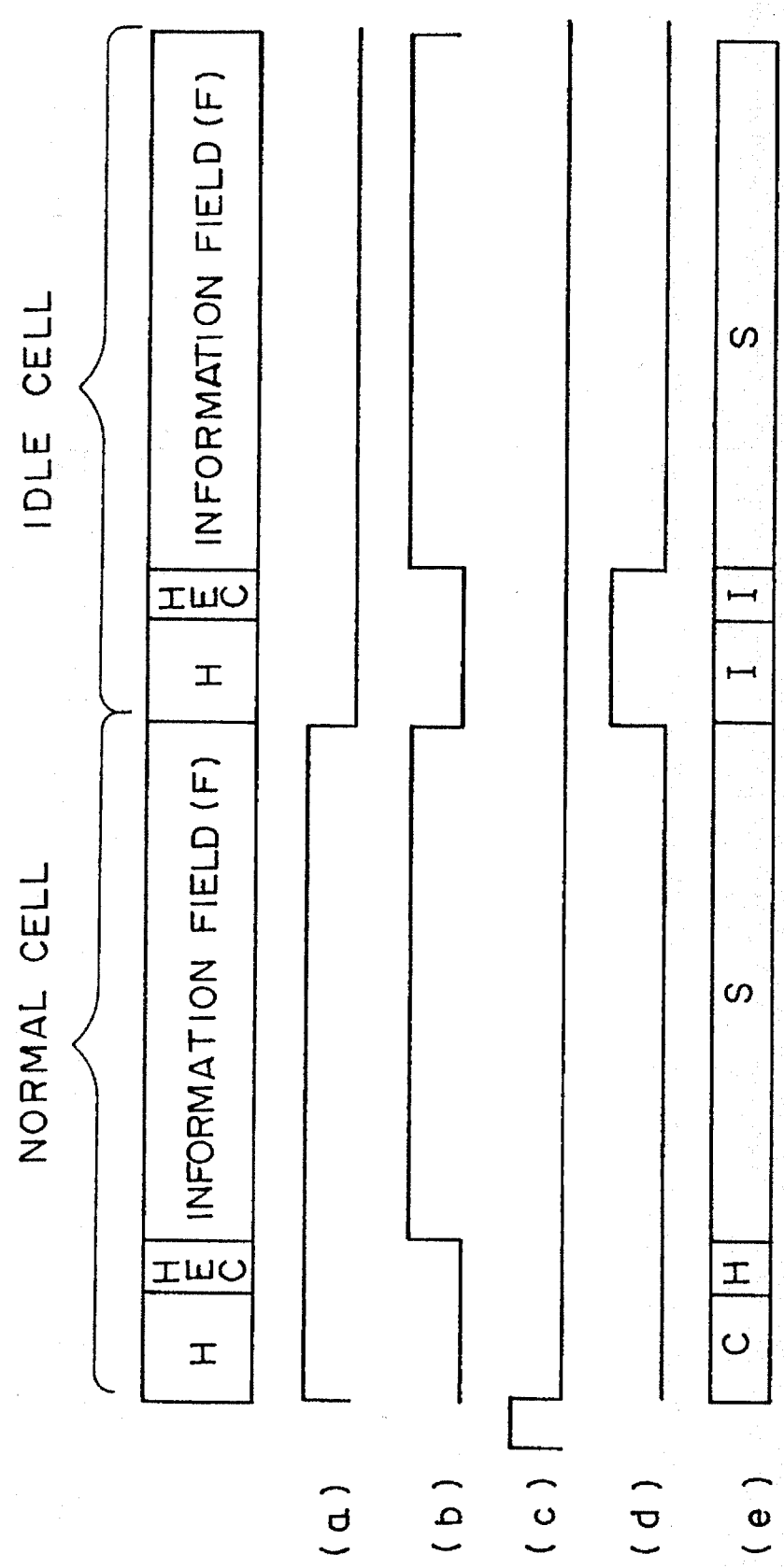
FIG. 7 is a flow chart illustrating operations of the transmission circuit shown in FIG. 5.

Referring to FIG. 7, first, the controller 65 activates the control signal (c) supplied to the error correcting code generator 4, so that the error correcting code generator 2 is activated. Then the controller 6 activates the control signal (a) supplied to the cell data output unit 1 and the first selecting signal SELECT1 (C) of the control signal (e) supplied to the selector 5. As a result, the cell data output unit 1 outputs a normal cell and the selector 5 selects the cell data output unit 1. Thus, the heading data (H) of the normal cell output from the cell data output unit 1 is output via the selector 5. When the cell data output unit 1 outputs the heading data (H), the error correcting code generating unit 4 calculates the error correcting code based on the heading data (H). Then the controller 6 activates the third selecting signal SELECT3 (H) of the control signal (e) supplied to the selector 5. The selector 5 switches the selection to the error correcting code generator 2 in accordance with the third selecting signal SELECT3. As a result, the head error correcting code output from the error correcting code generator 2 passes through the selector 5. After this, the controller 6 activates the control signal (b) supplied to the scrambler 3 and the second selecting signal SELECT2 (S) of the control signal (e) supplied to the selector 5. The selector 5 switches the selection to the scrambler 3 in accordance with the second selecting signal SELECT2. As a result, the information field (F) of the normal cell output from the cell data output unit 1 is scrambled by the scrambler 3 and passes through the selector 5. Due to the above operations, this transmission circuit outputs a normal cell data as shown in FIG. 1A.

In a case where an idle cell is transmitted after a normal cell, the controller 6 inactivetes the control signals (a) and (b) respectively supplied to the cell data output unit 1 and the scrambler 3, and activates the control signal (d) supplied to the idle cell generating unit 1. At this time, the fourth selecting signal SELECT4 (I) of the control signal (e) supplied to the selector 5 is activated. The selector 5 selects the idle cell generating unit 4 in accordance with the fourth selecting signal SELECT4. As a result, the head data (H) and the head error correcting code (HEC) having predetermined bit patterns are output from the idle cell generating unit 4 and pass through the selector 5. After this, the controller 6 inactivetes the control signal (d) supplied to the idle cell generating unit 4 and activates the control signal (b) supplied to the scrambler 3. At this time the second selecting signal SELECT2 (S) of the control signal (e) supplied to the selector 5 is activated. The selector 5 switches the selection to the scrambler 3 in accordance with the second selecting signal SELECT2. Thus, insignificant data (such as noise-)output from the cell data output unit 1 is scrambled by the scrambler 3, and the scrambled insignificant data is output as the information field (F) of the idle cell from the scrambler 3 and passes through the selector 5. Due to the above operation regarding the idle cell, tile idle cell as shown in FIG. 1A. is output from this transmission circuit via the selector 5.

In the first embodiment described above, the selector 5 having four input ports and one output port is used for selecting one of the cell data output unit 1, the scrambler 3, the error correcting code generator 2 and the idle cell generating unit 4 in this transmission circuit. In a case where 8-bit data is processed in this transmission circuit, the selector 5 can be formed of 32 NAND gates each having two input ports, 8 NAND gates each having four input ports and 8 D-type flip flops. Thus, the number of circuit elements in the transmission circuit can be decreased in comparison with the conventional transmission circuit having three selectors as shown in FIG. 2.

Figure 8:
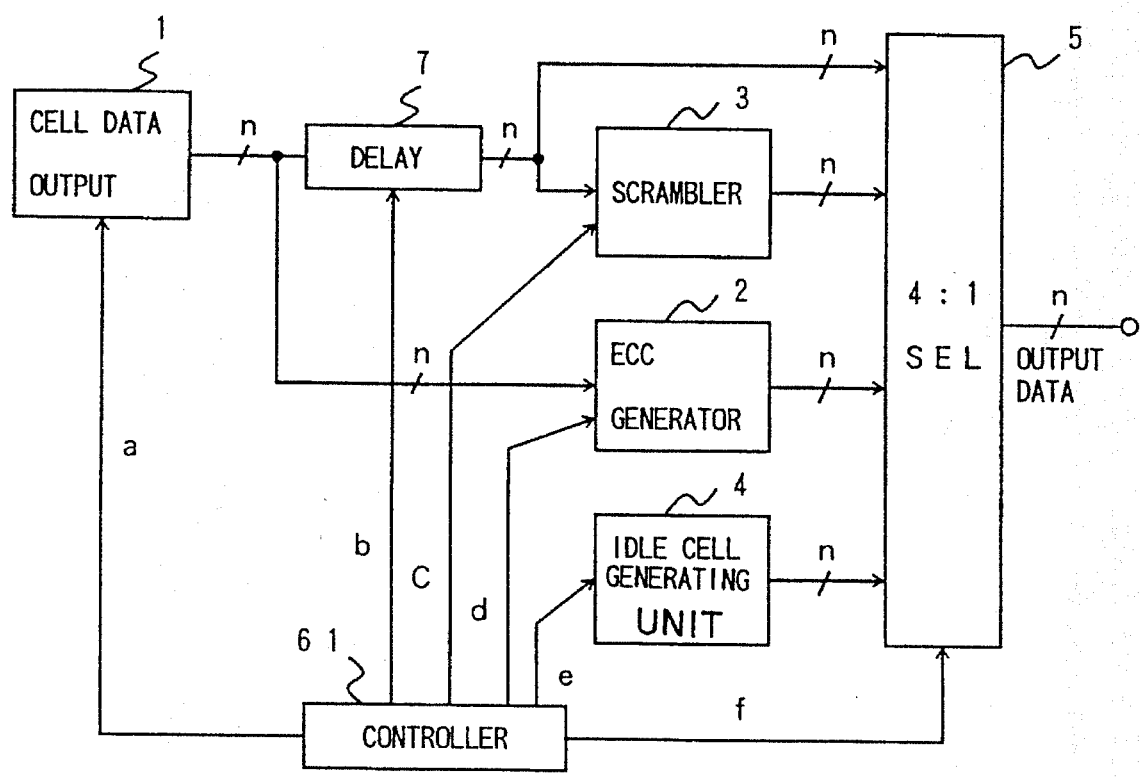
FIG. 8 is a block diagram illustrating a modification of the first embodiment of the present invention.

FIG. 8 shows a modification of the first embodiment. In this modification, the delay time of the process in the error correcting code generator 2 is greater than the period of the clock signal. In FIG. 8, those parts which are the same as those shown in FIG. 5 are given the same reference numbers.

Figure 9:
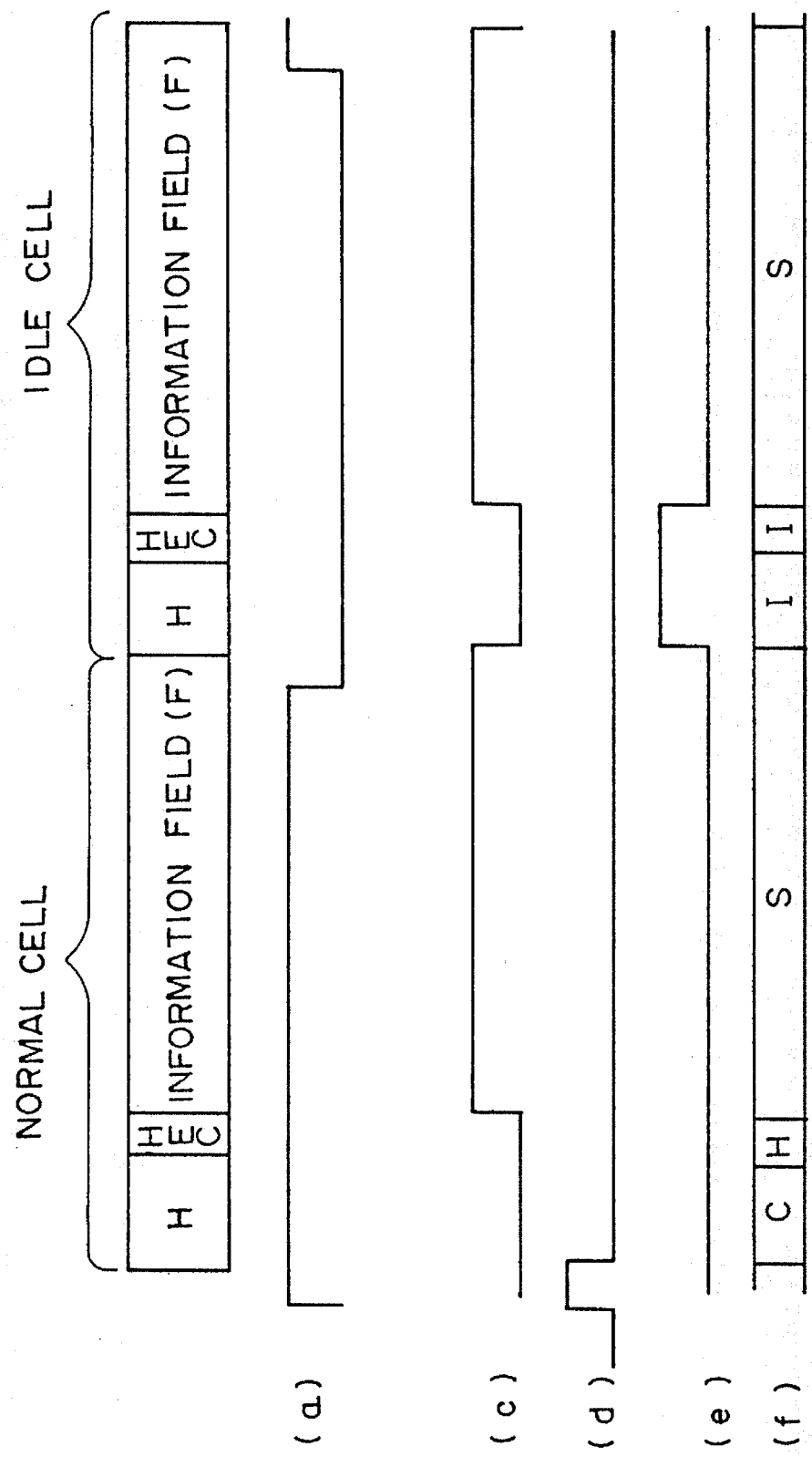
FIG. 9 is a flow chart illustrating operations of the transmission circuit shown in FIG. 8.

Referring to FIG. 8, a delay circuit 7 is provided in this transmission circuit so that the normal cell data output from the cell data output circuit 1 is supplied to the selector 5 and scrambler 3 via the delay circuit 7. The delay circuit 7 is formed, for example, of D-type flip flops each corresponding to one bit of n-bit parallel data. The delay circuit 7 delays the normal cell data output from the cell data output unit 1 by one clock pulse. The controller 61 activates, in consideration of delay time in the delay circuit 7, control signals (a) (b) (C) (d) (e) and (f) respectively supplied to the cell data output unit 1, the delay circuit 7, the scrambler 3, the error correcting code generator 2, the idle cell generating unit 4 and the selector 5, as shown in FIG. 9. Thus, even if the delay time of the process in the error correcting code generator 2 is greater than the period of the clock signal, the heading data (H), the head error correcting code (HEC) and the information field (F) can be transmitted in continuous time slots.

Figure 10:
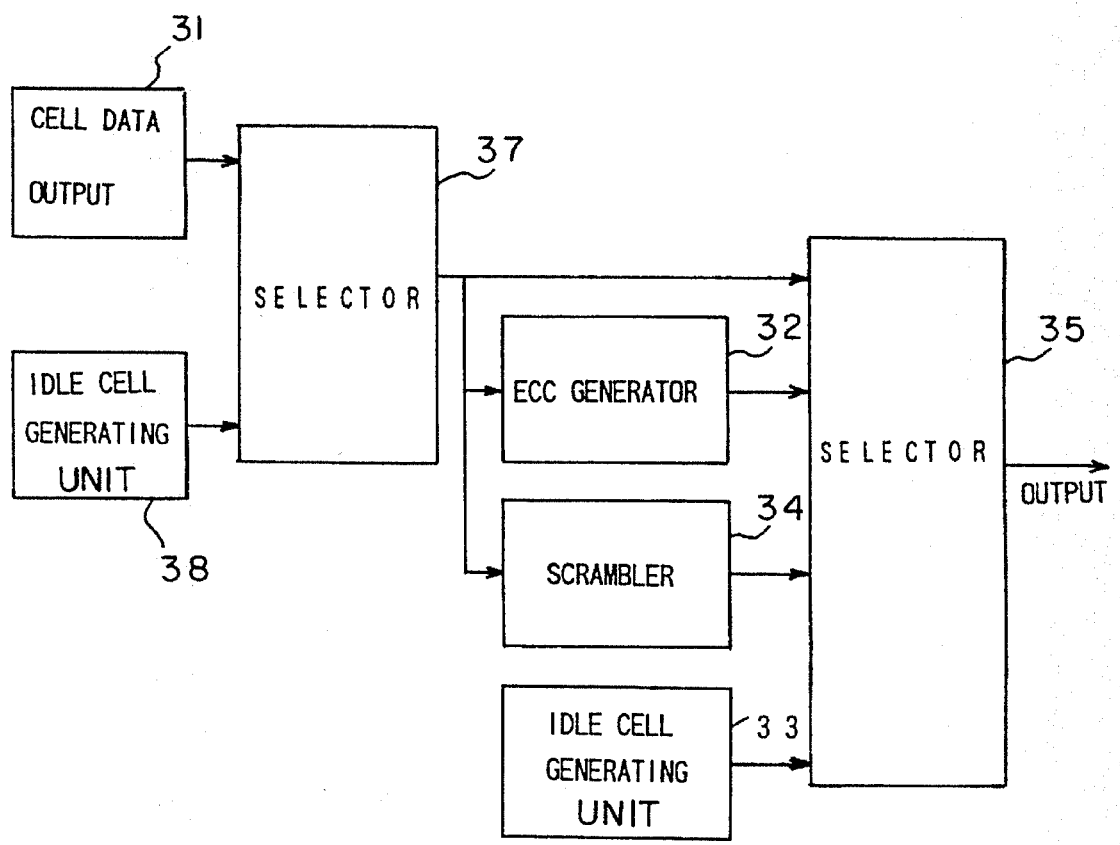
FIG. 10 is a block diagram illustrating an essential part of a transmission circuit according to a second embodiment of the present invention.

A description will now be given of the principle of a second embodiment of the present invention with reference to FIG. 10. In FIG. 10, those parts which are the same as those shown in FIG. 4 are given the same reference numbers. In the second embodiment, the information field of the idle cell is formed of a predetermined bit pattern.

Referring to FIG. 10, a second idle cell generating unit 36 for generating a predetermined bit pattern used as the information field (F) of the idle cell and a second selector 37 selecting either the cell data output unit 1 or the second idle cell generating unit 36 are provided in the transmission circuit. The output port of the second selector 37, the error correcting code generator 32, the scrambler 34 and a first idle cell generating unit 33 for generating the heading data (H) and the head error correcting code having predetermined bit patterns are connected to a first selector 35.

When the second selector 37 selects the second idle cell generating unit 36 and the first selector 35 selects the second selector 37, the information field (F), having the predetermined bit pattern, of the idle cell is output from this transmission circuit via the second and first selectors 37 and 35. In a case where the second selector 37 selects the cell data output unit 31, this transmission circuit operates in the same manner as that shown in FIG. 4.

Figure 11:
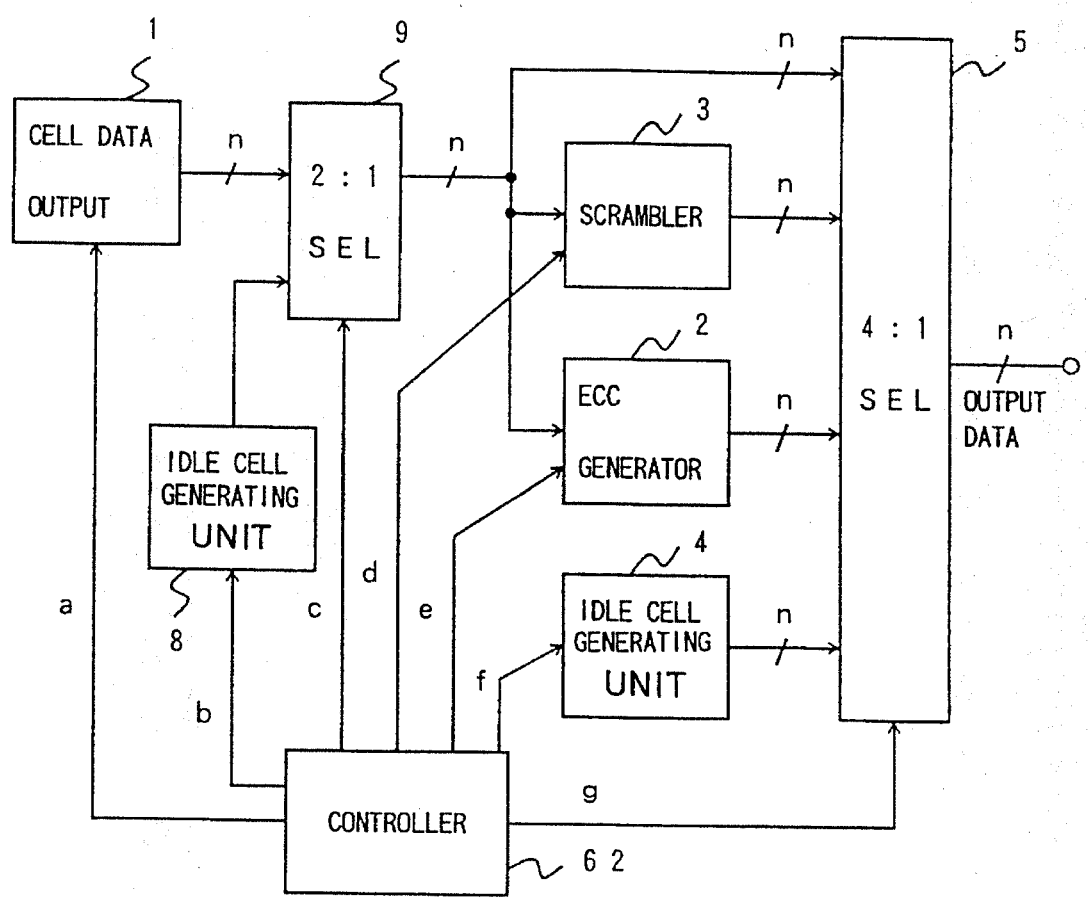
FIG. 11 is a block diagram illustrating a transmission circuit according to the second embodiment of the present invention.

A transmission circuit according to the second embodiment is shown in FIG. 11. In FIG. 11, those parts which are the same as those shown in FIG. 5 are given the same reference numbers.

Figure 3:
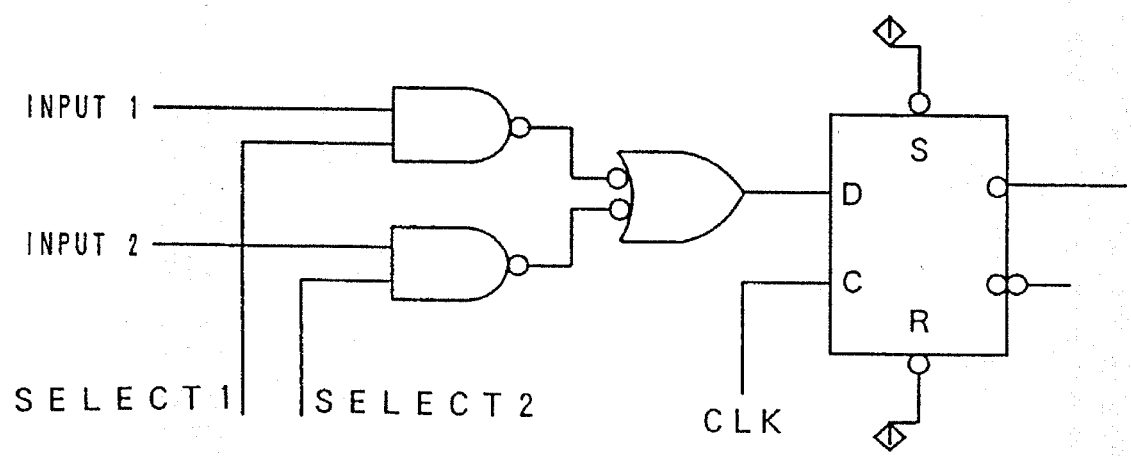
FIG. 3 is a diagram illustrating a selector.

Referring to FIG. 11, the transmission circuit has the cell data output unit 1, the error correcting code generator 2, the scrambler 3, a first idle cell generating unit 4, a first selector 5, a second idle cell generating unit 8, a second selector 9 and a controller 62. The second selector 9 has two input ports and one output port and includes the circuit as shown in FIG. 3. The cell data output unit 1 and the second idle cell generating unit 8 are connected to the second selector 9. The first selector 5 has four input ports and one output port and includes the circuit as shown in FIG. 6. The second selector 9, the scrambler 3, the error correcting code generator 2 and tile first idle cell generating unit 4 are connected to the first elector 5. The first idle cell generator 4 generates the heading data (H) and the head error correcting code (HEC) having predetermined bit patterns. The second idle cell generator 8 generates a predetermined bit pattern used as the information field (F) of the idle cell. The controller 62 outputs control signals (a) (b) (c) (d) (e) (f) and (g) respectively supplied to the cell data output unit 1, the second idle cell generating unit 8, the second selector 9, the scrambler 3, the error correcting code generator 3, the first idle cell generating unit 4 and the first selector 5.

Figure 12:
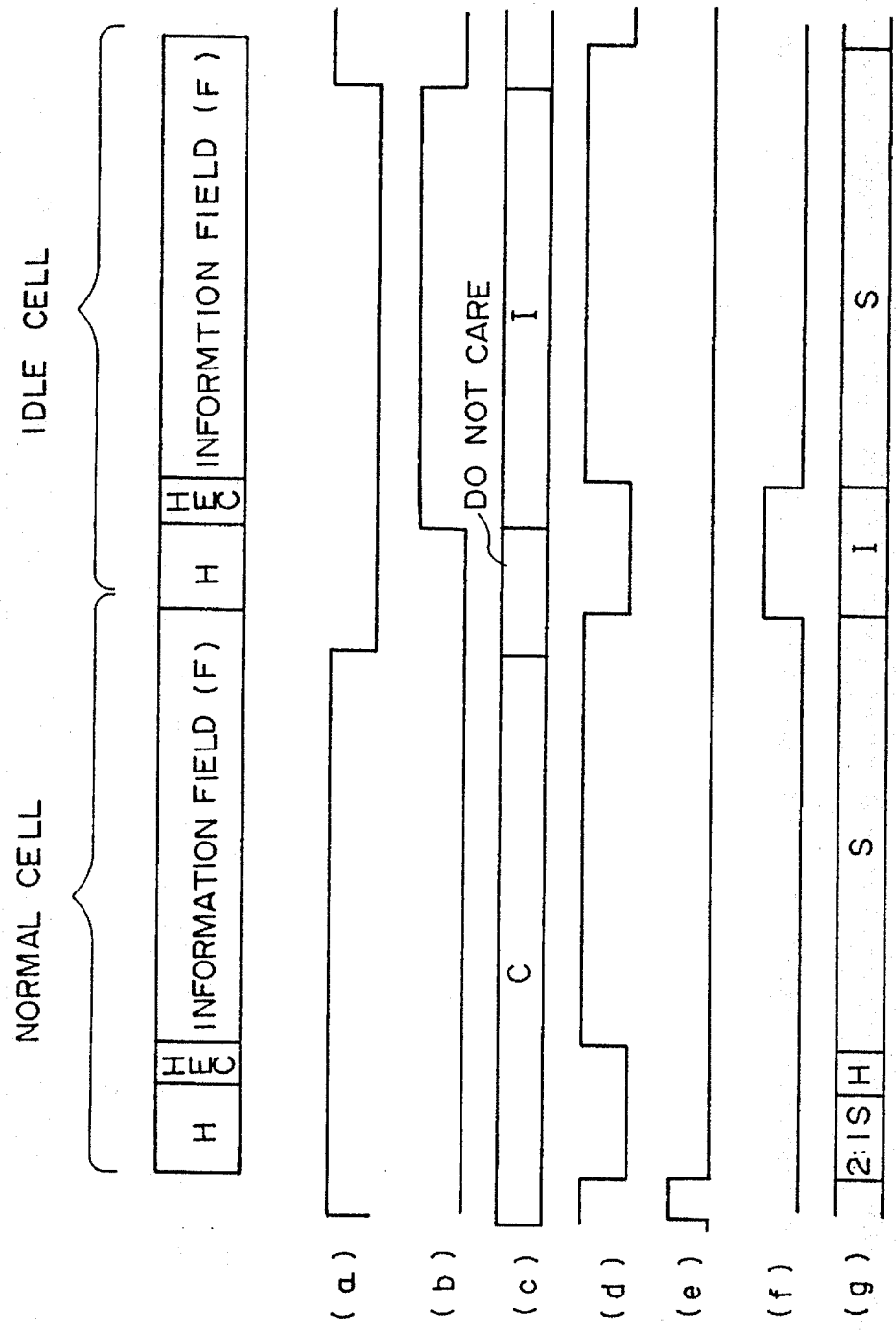
FIG. 12 is a flow chart illustrating operations of the transmission circuit shown in FIG. 11.

In a case where the normal cell and the idle cell are continuously transmitted, the control signals (a) through (g) are activated as shown in FIG. 12.

When the normal cell is transmitted, the call data output unit 1, the scrambler 3, the error correcting code generator 2, the first idle cell generating unit 4 and the first selector 5 are controlled in the same manner as those in the first embodiment shown in FIGS. 5–7 under a condition in which the second selector 9 selects the cell data output unit 1 (C). After the normal cell has been transmitted, the control signal (a) supplied to the cell data output unit 1 and the control signal (d) supplied to the scrambler 3 are deactivated and the control signal (f) supplied to the first idle generating unit 4 is activated. At this time, the first selector 5 switches the selection to the first idle cell generating unit 4 (I). As a result, the heading data (H) and the head error correcting code (HEC) having the predetermined bit patterns are output from the first idle cell generating unit 4 and pass through the first selector 5. After this, the control signal (f) is deactivated and the control signal (b) supplied to the second idle cell generating unit 8 and the control signal (d) supplied to the scrambler 3 are activated. At this time, the second selector 9 selects the second idle cell generating unit 8 and the first selector 5 selects the scrambler 3. As a result, the predetermined bit pattern output from the second idle cell generating unit 8 is supplied to the scrambler 3 via the second selector 9, and the bit pattern is scrambled by the scrambler 3. Then the scrambled bit pattern output from the scrambler 3 passes through the first selector 5. Due to the above operations regarding the idle cell, the idle cell in which the information field (F) thereof is formed of the scrambled bit pattern is transmitted from this transmission circuit.

In the second embodiment, the first selector 5 having four input ports and the second selector 8 having two input ports are provided with the transmission circuit. Thus, the number of circuit elements can be decreased in comparison with the conventional transmission circuit having three selectors each having two input ports.

Figure 13:
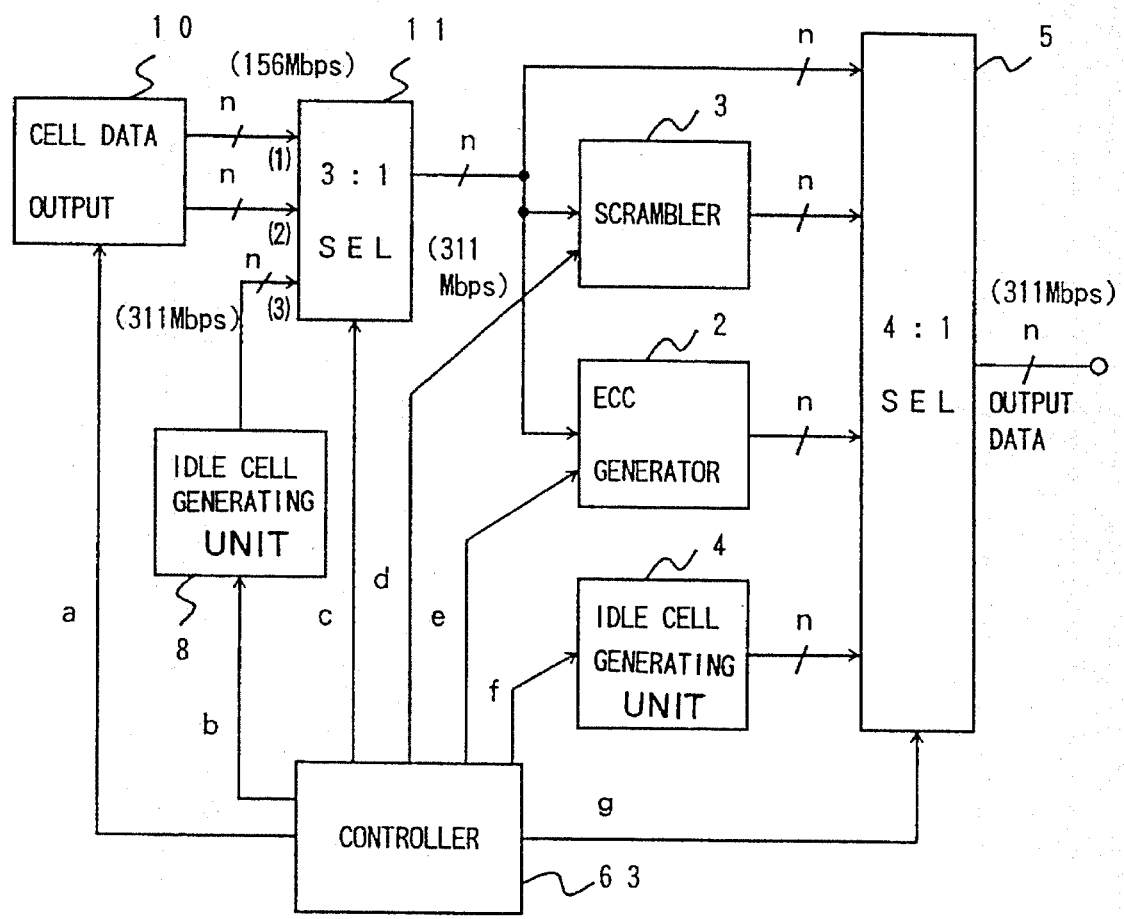
FIG. 13 is a block diagram illustrating a first modification of the second embodiment.
Figure 14:
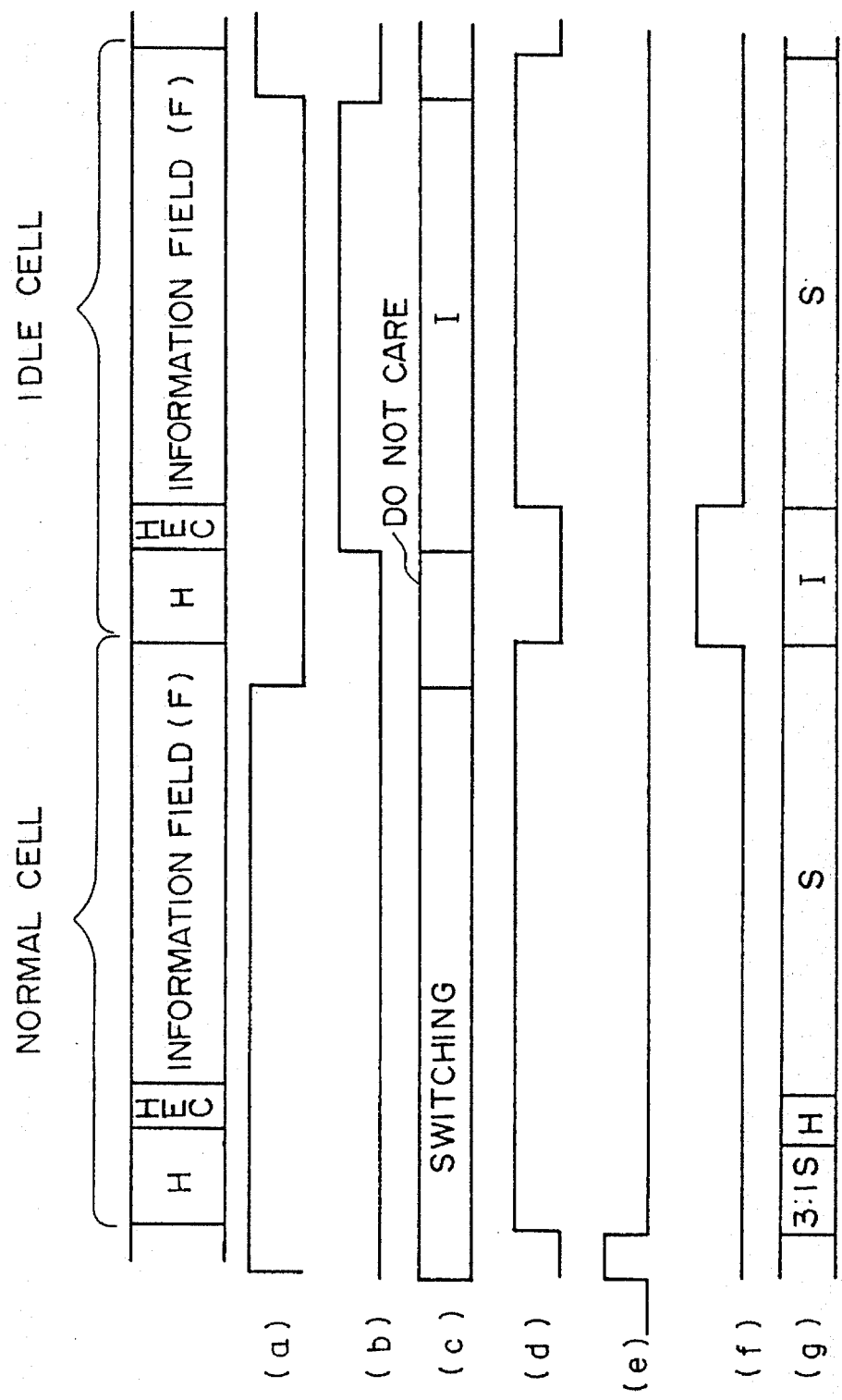
FIG. 14 is a flow chart illustrating operations of the transmission circuit shown in FIG. 13.

A description will now be given of a first modification of the second embodiment of the present invention with reference to FIGS. 13 and 14. In FIG. 13, those parts which are the same as those shown in FIG. 11, In the first modification of the second embodiment, a process speed in the cell data output unit 10 is less than a process speed in each of other circuit units in the transmission circuit. Thus, data output from the cell data output unit 10 is multiplexed by a selector 11 so that a transmission rate at which the data passes through the selector 11 increases substantially.

Referring to FIG. 13, the cell data output unit 10 outputs 2n-bit parallel data. The cell data output unit 10 and the second idle cell generating unit 8 are connected to the selector 11. The selector 11 has three input ports: the first, second and third input ports (1) (2) and (3). The high order n bits of the 2n-bit parallel data output from the cell data output unit 10 and the low order n bits thereof are respectively input to the first and second input ports (1) and (2) of the selector 11. Data having a predetermined bit pattern (n bits) is supplied from the second idle cell generating unit 8 to the third input port (3) of the selector 11. When the normal cell is transmitted, the selector 11 selects the first and second input ports (1) and (2) alternately. Thus, the high order n bits of the 2n-bit parallel data and the low order n bits thereof alternately pass through the selector 11 so that the selector 11 outputs multiple data having n bits.

In a case where a signal transmission rate in the line is, for example, 2.4 Gbps and 8-bit data output from the ATM transmission circuit is converted into serial data (8:1) to be transmitted through the line, the ATM transmission circuit outputs the 8-bit parallel data at a rate of 311 Mbps (n=8, 2R=311). When the cell data output unit 10 outputs 16-bit parallel data at a rate of 156 Mbps (2n=16), the multiple data having 8 bits are output from the selector 11 at the rate of 311 Mbps. That is, the data output from the tell data output unit 1 is multiplexed by the selector 11 so that a transmission rate is doubled.

When the selector 11 selects the third input port, the predetermined bit pattern output from the second idle cell generating unit 8 passes through the selector 11.

The controller 63 outputs control signals (a) (b) (c) (d) (e) (f) and (g) respectively supplied to the cell data output unit 10, the second idle data generating unit 8, the selector 11, the scrambler 3, the error correcting code generator 2, the first idle cell generating unit 4 and the selector 5. Due to the activation of the control signals (a) (b) (c) (d) (e) (f) and (g) as shown in FIG. 14, the normal cell as shown in FIG. 1A and the idle cell as shown in FIG. 1B are continuously transmitted from this transmitting circuit.

Figure 15:
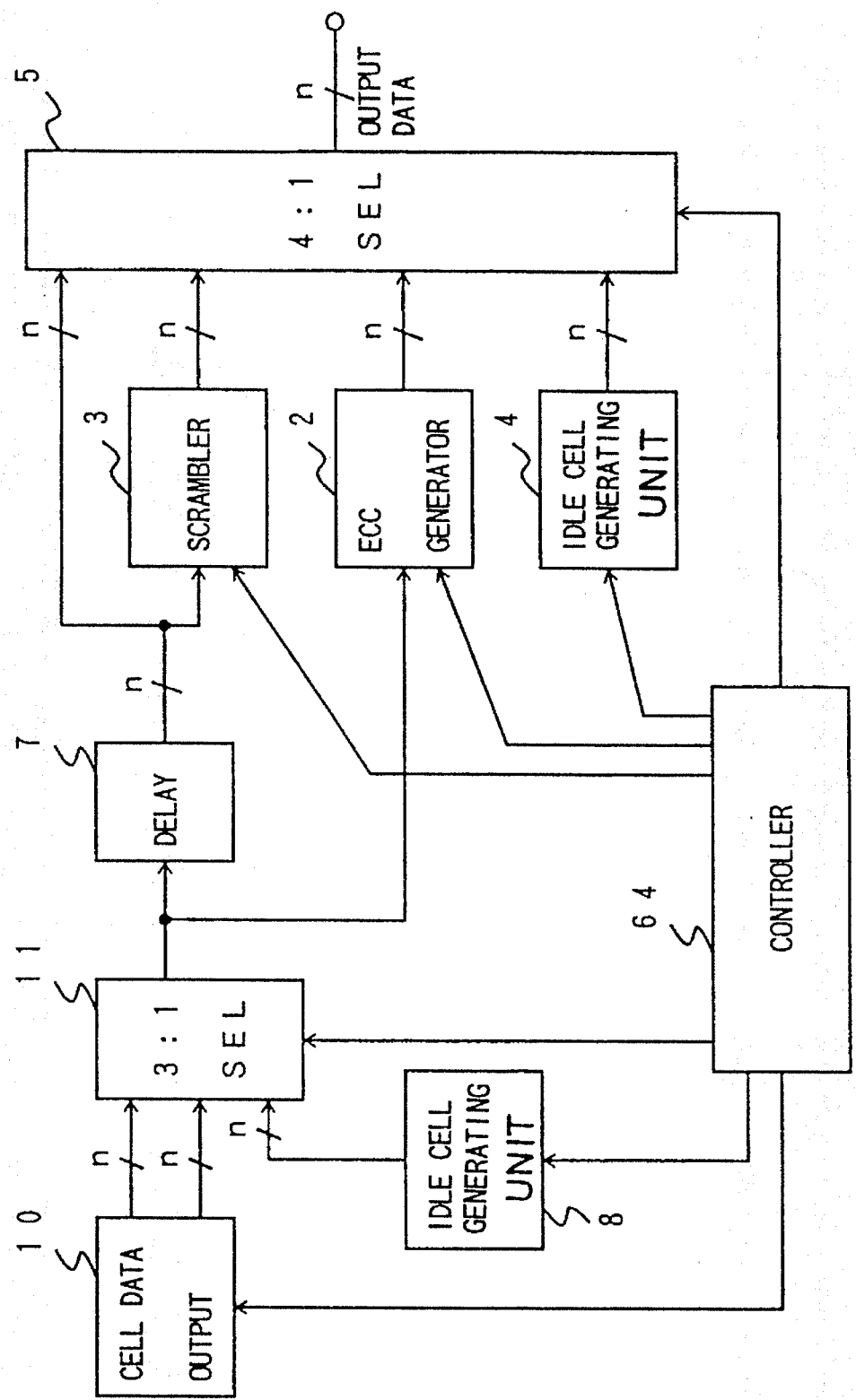
FIG. 15 is a block diagram illustrating a second modification of the second embodiment.

FIG. 15 shows a second modification of the second embodiment. In FIG. 15, those parts which are the same as those shown in FIGS. 8 and 13 are given the same reference numbers. A transmission circuit shown in FIG. 15 can be formed by a combination of circuits shown in FIGS. 8 and 13. In the transmission circuit shown in FIG. 15, the data output from the cell data output unit 10 is multiplexed by the selector 11 so that the data transmission rate is doubled. In addition, the data output from the selector 11 is delayed by the delay circuit 7 and supplied to the scrambler 3 and the selector 5 so as to compensate for a delay time in the error correcting code generator 2.

Figure 16:
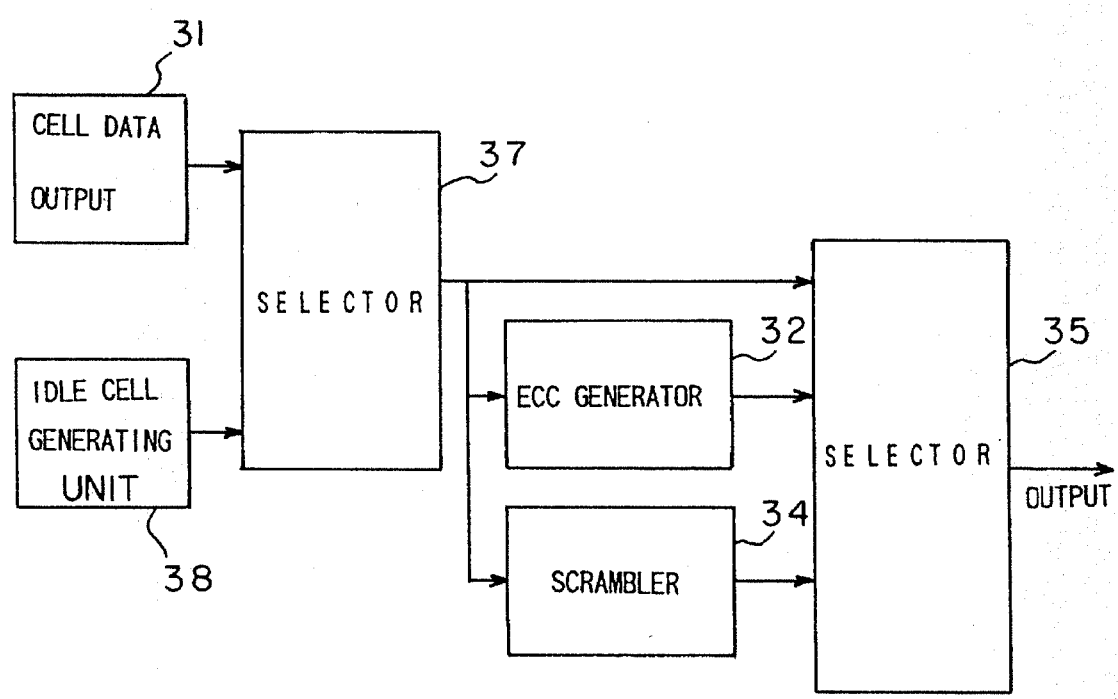
FIG. 16 is a block diagram illustrating an essential part of a transmission circuit according to a third embodiment of the present invention.

A description will now be given of the principle of a third embodiment of the present invention with reference to FIG. 16. In FIG. 16, those parts which are the same as those shown in FIGS. 4 and 10 are given the same reference numbers.

Referring to FIG. 16, the cell data output unit 31 and an idle cell generating unit 38 are connected to the second selector 37. The output port of the second selector 37, the error correcting code generator 32 and the scrambler 34 are connected to the first selector 35. When the idle cell is transmitted, the second selector selects the idle cell generating unit 1 and the first selector 35 selects the second selector 37. The heading data (H) and the head error correcting code (HEC) of the idle cell output from the idle cell generating unit 38 pass through the second and first selectors 37 and 35, and are output from this transmission circuit. Then the first selector 35 switches the selection to the scrambler 34. As a result, the information field (F) of the idle cell output from the idle generating unit 38 ie supplied to the scrambler 34 via the second selector 37. Then, scrambled data output from the scrambler 34 is output via the selector 35.

Figure 17:
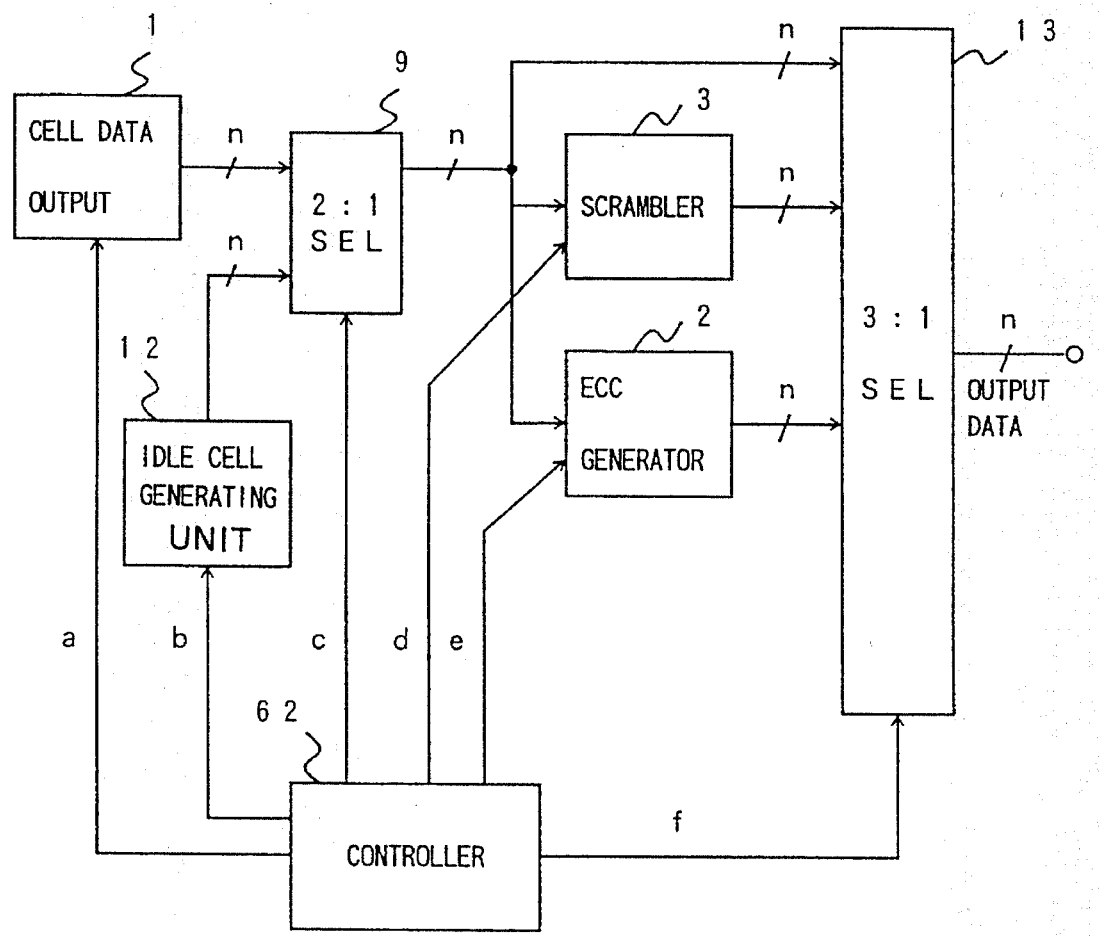
FIG. 17 is a block diagram illustrating a transmission circuit according to the third embodiment of the present invention.

FIG. 17 shows a transmission circuit according to the third embodiment of the present invention. In FIG. 17, those parts which are the same as those shown in FIGS. 5, 8, 11, 13 and 15 are given the same reference numbers.

Referring to FIG. 17, the cell data output unit 1 and the idle cell generating unit 12 are connected to the selector 9. The idle cell generating unit 12 successively outputs the heading data (H) and the head error correcting code (HEC) and the information field (F) of tile idle cell. The selector 9 has two input ports and one output port and includes the circuit as shown in FIG. 3. The output port of the selector 9, the scrambler 3 and the error correcting code generator 2 are connected to a selector 13. The selector 13 has three input ports and one output port. The controller 62 outputs control signals (a) (b) (c) (d) (e) and (f) respectively supplied to the cell data output unit 1, the idle cell generating unit 12, the selector 9, the scrambler 3, the error correcting coda generator 2 the selector 13. The control signal (a) (b) (c) (d) (e) and (f) are activated as shown in FIG. 18, so that the normal cell and the idle cell are continuously output from this transmission circuit. When the idle cell is transmitted, first, the selector 9 selects the idle cell generating unit 12 and the selector 13 selects the output port of the selector 9. The heading data (H) and the head error correcting code (HEC) having predetermined bit patterns are output from the idle cell generating unit 12 and pass through the selectors 9 and 13, so that the heading data (H) and the head error correcting code (HEC) are output from this transmission circuit. After this, the selector 13 switches the selection to the scrambler 3. As a result, the information field (F) having a predetermined bit pattern is supplied from the idle cell generating unit 12 to the scrambler 3 via the selector 9. The scrambled bit pattern used as the information field (F) of the idle cell is output from the scrambler 3 and passes through the selector 13. Due to the above operation, the idle cell as shown in FIG. 1B is output from this transmission circuit.

The transmission circuit according to each of the above embodiments transmits the cell data as shown in FIGS. 1A and 1. However, the present invention can be also applied to a transmission circuit for transmitting packet data having a fixed-length.

The present invention is not limited to the aforementioned embodiments, and variations and modifications may be made without departing from the scope of the claimed invention.

What is claimed is:

1. A transmission circuit for transmitting a first type of fixed-length data and a second type of fixed-length data via a communication line, said second type of fixed-length data being transmitted to fill time slots in the communication line at which there is no first type of fixed-length data to be transmitted, each of said first and second types of fixed-length data including first data, second data and third data, the first, second and third data of said first fixed-length data respectively indicating a destination, an error correcting code of the first data and desired information, the first and second data of said second type of fixed-length data having predetermined bit patterns and the third data of said second type of fixed-length data having any arbitrary bit pattern, said transmission circuit comprising:

first output means for generating and outputting the first data and the third data of the first type of fixed-length data;

error correcting code generating means, coupled to said first output means, for generating the second data of said first type of fixed-length data based on the first data of said first type of fixed-length data supplied from said first output means;

second output means for generating and outputting the first and second data of said second type of fixed length data;

scrambler means, coupled to said first output means, for scrambling the third data of said first type of fixed-length data supplied from said first output means; and a single selecting means, said error correcting code generating means and said scrambler means being arranged in parallel between said first input means and said single selecting means, said single selecting means being coupled between said first output means, said error correcting code generating means, said second output means and said scrambler means to receive all outputs thereof and an output terminal of said transmission circuit, for selecting an output of one of said first output means, said error correcting code generating means, said second output means and said scrambler means in accordance with a predetermined order, so that said first type of fixed-length data and said second type of fixed-length data are output from said selecting means, said selecting means including n identical circuits arranged in parallel, n being an integer corresponding to the number of bits in data being transmitted, each of said n circuits including four NAND gates each having a first input receiving a control signal and a second input receiving a bit of an output of the respective one of said first output means, said error correcting code generating means, said second output means and said scrambler means, an OR gate which is coupled to and receives all outputs of said four NAND gates, and a D-type flip flop receiving an output of said OR gate and outputting said first type of fixed length data and said second type of fixed-data at said output terminal.

2. A transmission circuit as claimed in claim 1, wherein each of said first and second fixed-length data is cell data having a predetermined data length, the transmission circuit being connected in the communication line, and said cell data being transmitted in an asynchronous transfer mode via the communication line.

3. A transmission circuit as claimed in claim 1, further comprising:

delay means for delaying supplying data from said first output means to said selector means and scrambler means by a predetermined delay time corresponding to a process speed in said error correcting code generating means.

4. A transmission circuit for transmitting a first type of fixed-length data and a second type of fixed-length data via a communication line, said second type of fixed-length data being transferred to fill time slots in the communication line at which there is no first type of fixed-length data to be transmitted, each of said first and second types of fixed-length data including first data, second data and third data, the first, second and third data of said first fixed-length data respectively indicating a destination, an error correcting code of the first data and desired information, the first and second data of said second type of fixed-length data having predetermined bit patterns and the third data of said second type of fixed-length data having any arbitrary bit pattern, said transmission circuit comprising:

first output means for generating and outputting the first data of said first type of fixed-length data;

second output means for generating and outputting data having a predetermined bit pattern, the data output from said second output means being used as the third data of said second type of fixed-length data;

pre-selecting means, coupled to said first output means and second output means, for selecting an output of one of said first and second output means;

error correcting code generating means, coupled to said pre-selecting means, for generating the second data of said first type of fixed-length data based on the first data of said first type of fixed-length data supplied from said first output means via said pre-selecting means;

third output means for generating and outputting the first and second data of said second type of fixed-length data;

scrambler means, coupled to said pre-selecting means, for scrambling data supplied from said first and second output means via said pre-selecting means; and a single selecting means, coupled between said pre-selecting means, said error correcting code generating means, said third output means and said scrambler means to receive directly all outputs thereof, and an output terminal of said transmission circuit, for selecting an output of one of said pre-selecting means, said error correcting code generating means, said third output means and said scrambler means, wherein, due to selecting operations of said preselecting means and said selecting means, said first type of fixed length data and said second type of fixed-length data are output from said selecting means, said selecting means including n identical circuits arranged in parallel, n being an integer corresponding to the number of bits in data being transmitted, each of said circuits including four NAND gates each having a first input receiving a control signal and a second input receiving a bit of an output of the respective one of said pre-selecting means, said error correcting code generating means, said third output means and said scrambler means, respectively, an OR gate which is coupled to and receives all outputs of said four NAND gates, and a D-type flip flop receiving an output of said OR gate and outputting said first type of fixed length data and said second type of fixed-data at said output terminal.

5. A transmission circuit as claimed in claim 4, wherein each of said first and second fixed-length data is cell data having a predetermined data length, the transmission circuit being connected in the communication line, and said cell data being transmitted in an asynchronous transfer mode via the communication line.

6. A transmission circuit as claimed in claim 4, wherein said pre-selecting means has a plurality of first input ports for receiving the data output from said first output means, and a second input port for receiving the data output from said second output means, said pre-selecting means switching between the first input ports in turns so that a data transmission rate of said data output from said preselecting means increases.

7. A transmission circuit as claimed in claim 6, wherein said first input ports of said pre-selecting means, are two in number, high order bits of said first type of fixed-length data output from said first output means being input to one of said first input ports, low order bits of said first type of fixed-length data being input to another one of said first input ports.

8. A transmission circuit as claimed in claim 4, further comprising:

delay means for delaying supplying data from said pre-selecting means to said selector means and scrambler means by a predetermined delay time corresponding to a processing speed in said error correcting code generating means.

9. A transmission circuit for transmitting a first type of fixed-length data and a second type of fixed-length data via a communication line, said second type of fixed length data being transmitted to fill time slots in the communication line at which there is no first type of fixed-length data to be transmitted, each of said first and second types of fixed-length data including first data, second data and third data, the first, second and third data of said first fixed-length data respectively indicating a destination, an error correcting code of the first data and desired information, the first and second data of said second type of fixed-length data having predetermined bit patterns and the third data of said second type of fixed length data having any arbitrary bit pattern, said transmission circuit comprising:

first output means for generating and outputting the first data of said first type of fixed-length data;

second output means for generating and outputting data having a predetermined bit pattern, the data output from said second output means being used as the first and second and third data of said second type of fixed-length data;

pre-selecting means, coupled to said first output means and second output means, for selecting an output of one of said first and second output means;

error correcting code generating marts, coupled to said pre-selecting means, for generating the second data of said first type of fixed-length data based on the first data of said first type of fixed length data supplied from said first output means via said pre-selecting means;

scrambler means, coupled to said pre-selecting means, for scrambling data supplied from said first and second output means via said pre-selecting means;

control means coupled to said pre-selecting means, said error correcting code generating means and said scrambler and generating a select signal; and a single selecting means, connected to said control means and also coupled between said preselecting means, said error correcting code generating means and said scrambler means to receive directly all outputs thereof, and an output terminal of said transmission circuit, for selecting, in response to said select signal, an output of one of said pre-selecting means, said error correcting code generating means and said scrambler means, wherein, due to selecting operations of said pre-selecting selecting means, said first type of fixed-length data and said second type of fixed-length data are output from said selecting means at said output terminal.

10. A transmission circuit as claimed in claim 9, wherein each of said first and second fixed-length data is cell data having a predetermined data length, the transmission circuit being connected in the communication line, and said cell data being transmitted in an asynchronous transfer mode via the communication line.

* * * * *